United States Patent
Sun et al.

(10) Patent No.: US 11,606,234 B2
(45) Date of Patent: *Mar. 14, 2023

(54) SYSTEMS, APPARATUSES AND METHODS FOR A SIGNAL EXTENSION PADDING SCHEME

(71) Applicant: NXP USA, INC., Austin, TX (US)

(72) Inventors: Yakun Sun, San Jose, CA (US); Hongyuan Zhang, Fremont, CA (US); Sudhir Srinivasa, Los Gatos, CA (US); Rui Cao, Sunnyvale, CA (US)

(73) Assignee: NXP USA, INC., Austin, TX (US)

( * ) Notice: Subject to any disclaimer, the term of this patent is extended or adjusted under 35 U.S.C. 154(b) by 74 days.

This patent is subject to a terminal disclaimer.

(21) Appl. No.: 17/194,847

(22) Filed: Mar. 8, 2021

(65) Prior Publication Data

US 2021/0194621 A1  Jun. 24, 2021

Related U.S. Application Data

(63) Continuation of application No. 16/295,499, filed on Mar. 7, 2019, now Pat. No. 10,944,502, which is a continuation of application No. 15/179,150, filed on Jun. 10, 2016, now Pat. No. 10,230,490.

(60) Provisional application No. 62/174,158, filed on Jun. 11, 2015.

(51) Int. Cl.
*H04L 27/26* (2006.01)
*H04L 1/00* (2006.01)
*H04L 5/00* (2006.01)

(52) U.S. Cl.
CPC ........ *H04L 27/2602* (2013.01); *H04L 1/0008* (2013.01); *H04L 1/0009* (2013.01); *H04L 1/0041* (2013.01); *H04L 5/0007* (2013.01); *H04L 1/0057* (2013.01)

(58) Field of Classification Search
None
See application file for complete search history.

(56) References Cited

U.S. PATENT DOCUMENTS

| | | | | |
|---|---|---|---|---|
| 10,230,490 B2* | 3/2019 | Sun | ....................... | H04L 5/0007 |
| 10,944,502 B2* | 3/2021 | Sun | ....................... | H04L 1/0041 |
| 2011/0150110 A1* | 6/2011 | Kenney | ................. | H04L 1/0009 |
| | | | | 375/279 |
| 2014/0126659 A1* | 5/2014 | Srinivasa | .............. | H04L 1/0643 |
| | | | | 375/260 |

FOREIGN PATENT DOCUMENTS

KR  1020150038389  4/2015

* cited by examiner

*Primary Examiner* — Saad Khawar

(57) ABSTRACT

Systems, apparatuses and methods described herein provide a method for padding a signal extension of orthogonal frequency-division multiplexing (OFDM) symbols. A transceiver may obtain a plurality of data symbols for transmission, and determine that a number of information bits for a last symbol of the plurality of data symbols is not an integer value. A special padding rule may be applied to add padding bits to the last symbol. A number of coded bits for the last symbol may be determined when the number of information bits for the last symbol has changed, and the plurality of data symbols for data transmission may be encoded based on the determined number of coded bits for the last symbol.

10 Claims, 6 Drawing Sheets

SYSTEMS, APPARATUSES AND METHODS FOR A SIGNAL EXTENSION PADDING SCHEME

CROSS-REFERENCE TO RELATED APPLICATION

This application is a continuation application of U.S. patent application entitled "SYSTEMS, APPARATUSES AND METHODS FOR A SIGNAL EXTENSION PADDING SCHEME", having a Ser. No. 16/295,499, having a filing date of Mar. 7, 2019; which is a continuation application of U.S. patent application entitled "SYSTEMS, APPARATUSES AND METHODS FOR A SIGNAL EXTENSION PADDING SCHEME", having a Ser. No. 15/179,150, having a filing date of Jun. 10, 2016; which claims the benefit of U.S. provisional application entitled "PADDING WITH SIGNAL EXTENSIONS", having a Ser. No. 62/174,158, and having a filling date of Jun. 11, 2015, having common inventors, and having a common assignee, all of which is incorporated by reference in its entirety.

FIELD OF USE

This disclosure relates to a padding scheme for orthogonal frequency-division multiplexing (OFDM) signal extensions in a wireless data transmission system, for example, but not limited to a wireless local area network (WLAN) implementing the Institute of Electrical and Electronics Engineers (IEEE) 802.11 standard and any other standards and/or networks that can provide wireless transfer of data in outdoor deployments, outdoor-to-indoor communications, and device-to-device (P2P) networks.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Orthogonal frequency-division multiplexing (OFDM) is often used to encode data on multiple carrier frequencies to improve data transmission performance under undesirable channel conditions. The current IEEE 802.11ax standard has adopted a 4×OFDM symbol duration to improve data efficiency. The longer data symbol, however, can often result in heavier processing complexity at the receiver. To help the receiver to process the longer data symbol with as little processing logic overhead as possible, a signal extension (SE) of multiples of 4 µs can be used to allow additional processing time at the receiver before the next data symbols is received. Further discussion of SE with OFDM data symbols can be found in U.S. application Ser. No. 14/728,802, entitled "High Efficiency Orthogonal Frequency Division Multiplexing (OFDM) Physical Layer (PHY)," filed on Dec. 3, 2015, which is herein expressly incorporated by reference.

Padding bits can be added to the last OFDM symbol according to the SE. For example, SE can be set to be a×4 µs where a=1, 2, 3 or 4. In this case, the useful bits in the last OFDM symbol may be determined based on a×¼ of $N_{CBPS}$, where $N_{CBPS}$ denotes the number of coded bits per symbol. When $N_{CBPS}$ is not multiples of 4, some modulation coding selection (MCS) scheme and SE combinations may lead to setting the number of padding bits to a non-integer number that is generally difficult, if not at all impossible, to implement.

SUMMARY

Systems, apparatuses and methods described herein provide a method for padding a signal extension of orthogonal frequency-division multiplexing (OFDM) symbols. The method comprises obtaining, at a transceiver, a plurality of data symbols for transmission, and determining that a number of information bits for a last symbol of the plurality of data symbols is not an integer value. The method further comprises applying a special padding rule to add padding bits to the last symbol. The method further comprises determining a number of coded bits for the last symbol when the number of information bits for the last symbol has changed, and encoding the plurality of data symbols for data transmission based on the determined number of coded bits for the last symbol.

In some implementations, the method further comprises applying a signal extension for the last symbol of the plurality of data symbols. The last symbol has a relatively shorter length compared to other symbols from the plurality of data symbols. The number of information bits for the last symbol is divided by a plurality of encoders when the plurality of encoders are used.

In some implementations, the method further comprises adding a number of padding bits to the last symbol before forward error-corrective encoding based on the number of coded bits for the last symbol.

In some implementations, applying the special padding rule further comprises: adding a number of padding bits to the last symbol before encoding, wherein the number of padding bits equals the number of information bits for a last symbol; and unevenly distributing the number of padding bits across a plurality of encoders.

In some implementations, applying the special padding rule further comprises: adding a number of padding bits to the last symbol to make the number of information bits for the last symbol an integral value; and evenly distributing the number of padding bits across a plurality of encoders.

In some implementations, applying the special padding rule further comprises applying dynamic puncturing for a plurality of encoders.

In some implementations, applying the special padding rule further comprises enforcing the number of information bits for the last symbol to be an integer value by taking a ceiling or floor operation.

In some implementations, applying the special padding rule further comprises adopting a compatible value to be a number of scheduled data subcarriers such that the number of coded bits for the last symbol and the number of information bits for the last symbol are both integers.

In some implementations, applying the special padding rule further comprises determining an integer value for the number of coded bits for the last symbol by taking a ceiling or floor operation. The special padding rule further comprises determining a signal extension parameter based on the integer value for the number of coded bits for the last symbol, and adding a plurality of padding bits to the last symbol before encoding.

In some implementations, determining the number of coded bits for the last symbol further comprises dividing the changed number of information bits for the last symbol by a coding rate, and taking a ceiling operation over a result of the dividing.

Systems, apparatuses and methods described herein further provide a system for padding a signal extension of OFDM symbols. The system comprises an input data processing module to obtain a plurality of data symbols for transmission. The system further comprises a pre-encoding padding module communicatively coupled to the input data processing module. The pre-encoding padding module is configured to determine that a number of information bits for a last symbol of the plurality of data symbols is not an integer value. The pre-encoding padding module is further configured to apply a special padding rule to add padding bits to the last symbol. The pre-encoding padding module is further configured to determine a number of coded bits for the last symbol when the number of information bits for the last symbol has changed. The system further comprises an encoding module to encode the plurality of data symbols for data transmission based on the determined number of coded bits for the last symbol.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for a padding scheme for orthogonal frequency-division multiplexing (OFDM) signal extensions (SE) in a wireless data transmission system. According to this disclosure, a new padding procedure including special padding rules is adopted when the calculated number of data bits per symbol for the last OFDM symbol ($N_{DBPS,Last}$) is not integer, or the calculated number of data bits per symbol per encoder $$N_{DBPS,Last} / N_{ES}$$

(where $N_{ES}$ denotes the number of encoders) is not an integer when there are more than one encoders per regular data symbol. The number of coded bits $N_{CBPS,Last}$ for the last symbol may be re-computed based on the changed $N_{DBPS,Last}$, and these parameters can then be used for encoding.

Figure 1:
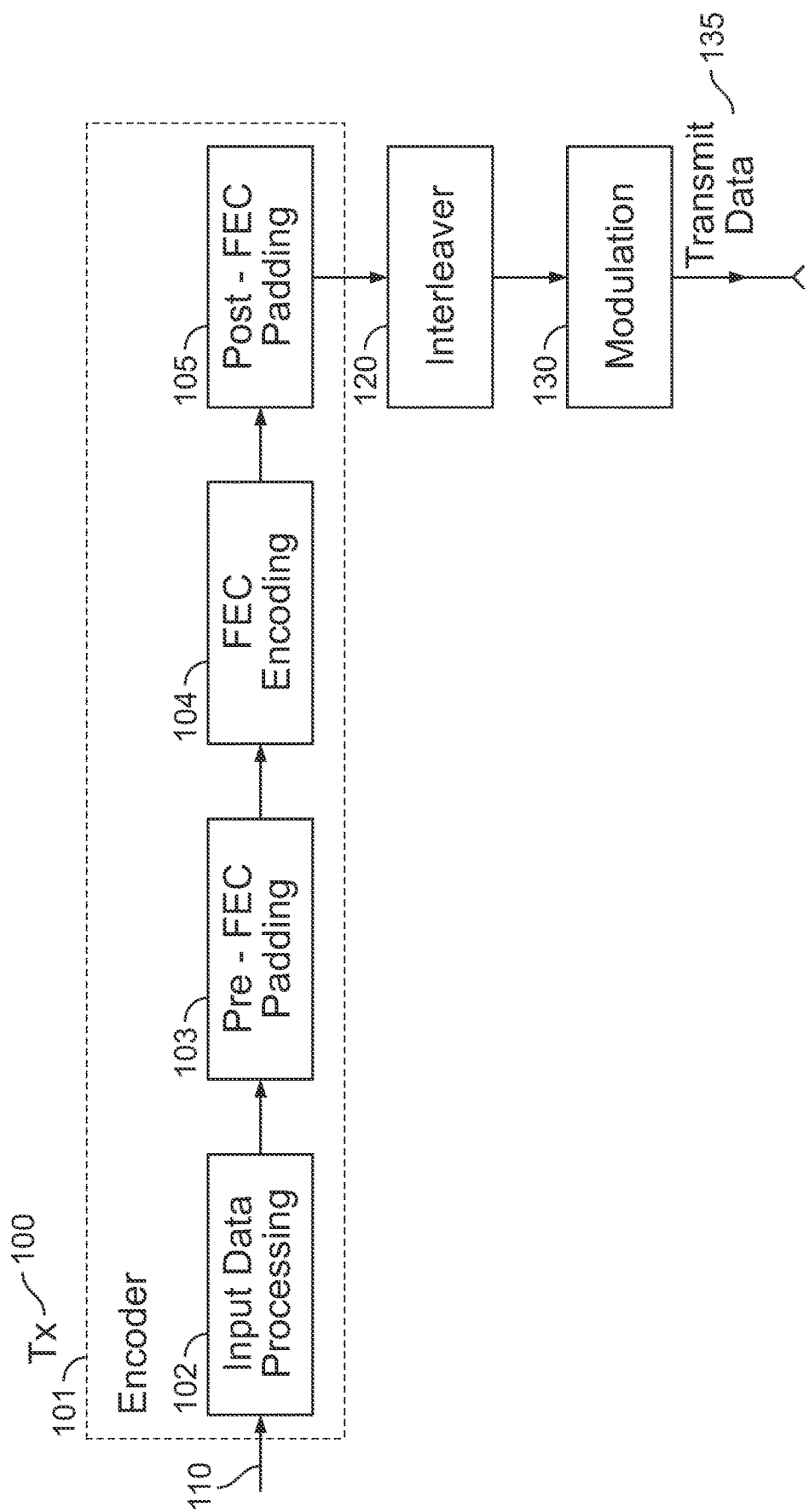
FIG. 1 provides an exemplary block diagram illustrating a transceiver system that includes a data encoder in which a padding scheme is employed, in accordance with various embodiments of the disclosure.

FIG. 1 provides an exemplary block diagram illustrating a transceiver system that includes a data encoder in which a padding scheme is employed, in accordance with various embodiments of the disclosure. As shown in FIG. 1, a transceiver system 100 may obtain input data 110 for transmission, e.g., from a processor of the system. An encoder 101 at the transceiver 100 may include an input data processing module 102 to pre-process data bits before forward error correcting (FEC) encoding. For example, the input data processing module 102 may determine parameters such as the number of coded bits per data symbol, a SE parameter, and/or the like, as further illustrated in 201-203 in FIG. 2.

The encoder 101 may further include a pre-FEC padding module 103, which may pad additional bits to the OFDM symbol, and then pass the padded bits to the FEC encoding module 104. A post-FEC padding module 105 can be employed to fill up the last OFDM symbol, e.g., with zero-padding. The padded data symbols may then be passed on to the interleaver 120 and modulation module 130 before transmitting the data 135. The data 135 may be modulated symbols output by modulation module 130.

Figure 2:
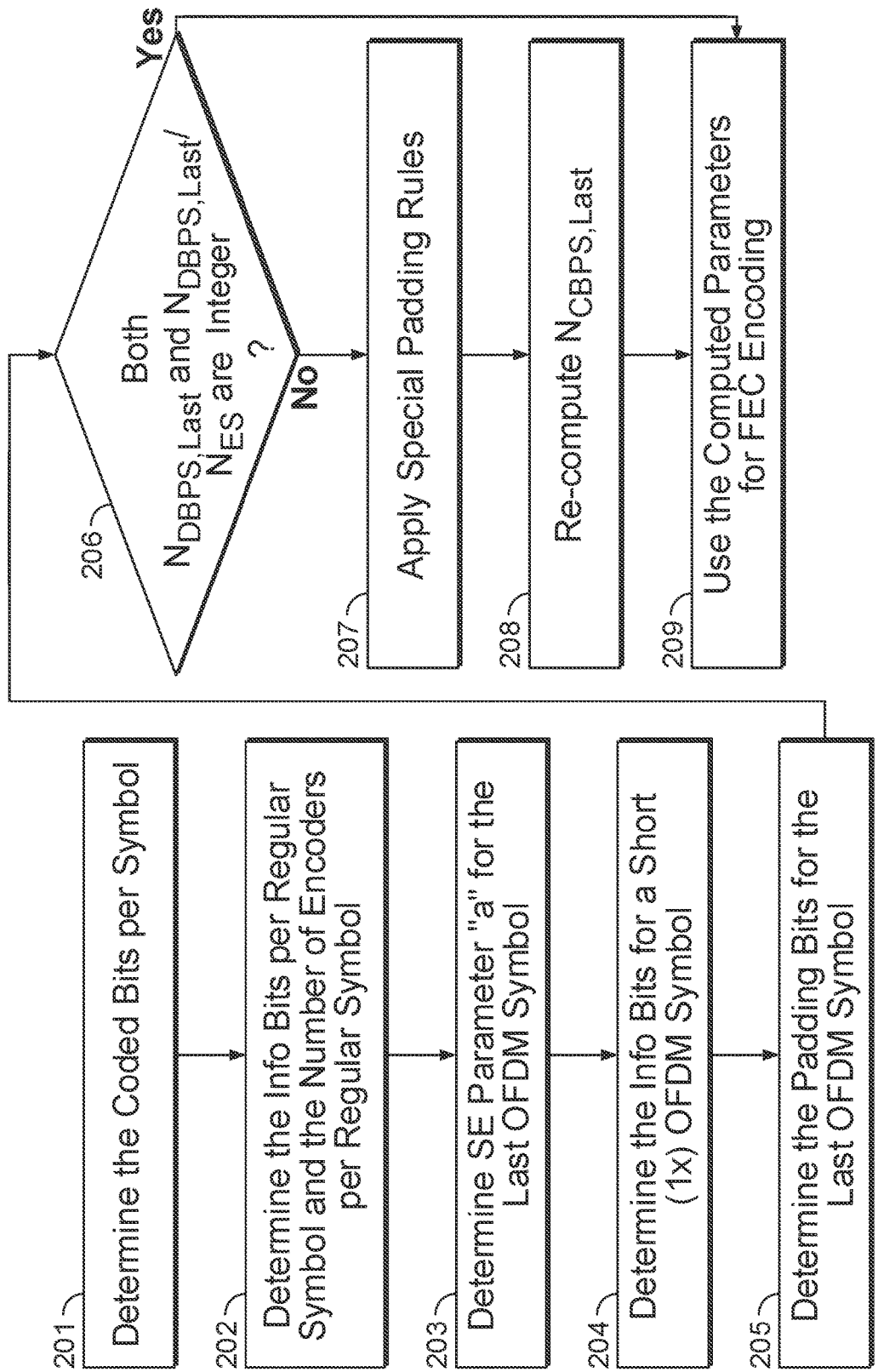
FIG. 2 provides an exemplary logic flow diagram illustrating a padding procedure that is implemented in an encoder (e.g., 101 in FIG. 1), in accordance with various embodiments of the disclosure.

FIG. 2 provides an exemplary logic flow diagram illustrating a padding procedure that is implemented in an encoder (e.g., 101 in FIG. 1), in accordance with various embodiments of the disclosure. At 201, an encoder may determine the coded bits per symbol. For example, the encoder may determine the coded bits per symbol ($N_{CBPS}$) for a user u based on the following determination $$N_{CBPS}^{(u)} = N_{SD}^{(u)} \times N_{SS}^{(u)} \times N_{BPSCS}^{(u)}$$

where $N_{CBPS}^{(u)}$ denotes the number of coded bits per symbol in a 4× symbol for user u; $N_{SD}^{(u)}$ denotes the number of scheduled data subcarriers in a 4× symbol for user u; $N_{SS}^{(u)}$ denotes the number of special strings in a 4× symbol for user u; and $N_{BPSCS}^{(u)}$ denotes the number of coded bits per subcarrier per spatial streams in a 4× symbol for user u, u=0, 1, 2, 3, etc. It is noted that for all the parameters defined above, the values can be configured differently for a specific user u, and the superscript "u" may be adopted or skipped interchangeably throughout the disclosure.

Specifically, when single user (SU) or multi-user (MU) multiple-input multiple-output (MIMO) system with physical protocol data unit (PPDU) is employed, $N_{SD}$ denotes the number of available data subcarriers.

At 202, the encoder determines the info bits per regular symbol. For example, the encoder may determine the info bits per symbol ($N_{DBPS}$) based on the following $N_{DBPS}^{(u)} = N_{CBPS}^{(u)} \times R^{(u)}$, where $N_{DBPS}^{(u)}$ denotes the number of data bits per symbol in a 4× symbol for user u, and R denotes the coding rate for user u, u=0, 1, 2, 3, etc.

The encoder may also determine the number of encoders per regular symbol, e.g., $$N_{ES}^u = \lceil N_{DBPS}^{(u)} / R^{(u)} \rceil,$$

wherein "⌈ ⌉" denotes a ceiling operation. For all valid number of scheduled data subcarriers, $N_{DBPS}^{(u)}$ and $$N_{DBPS}^{(u)} / N_{ES}^{(u)}$$

are integer numbers.

At 203, the encoder may start a pre-FEC padding procedure by determining a SE parameter "a" for the last OFDM symbol (i.e., a short symbol). Further discussion on determining the SE parameter "a" can be found in commonly owned U.S. application Ser. No. 14/728,802, which is herein expressly incorporated by reference. For example, the SE parameter a may take a value of 1, 2, 3 or 4.

At 204, the encoder may determine the number of information bits for a short (1×) OFDM symbol. In one example, the number of information bits can be determined based on the following:

$$N_{DBPS,short}^{(u)} = \frac{1}{4} N_{DBPS}^{(u)}.$$

For another example, the number of information bits can be determined based on the following:

$$N_{DBPS,short}^{(u)} = N_{CBPS,short}^{(u)} \times R^{(u)} = \frac{1}{4} N_{SD}^{(u)} \times N_{SS}^{(u)} \times N_{BPSCS}^{(u)} \times R^{(u)}.$$

At 205, the encoder determines the padding bits for the last OFDM symbol. For example, the number of data bits of the last symbol can be determined as follows: $N_{DBPS,last}^{(u)} = a \cdot N_{DBPS,short}^{(u)}$. The number of padding bits can be determined as follows: $N_{Pre\text{-}FEC\text{-}Pad}^{(u)} = N_{DBPS,last}^{(u)} - (N_{inf\_o}^{(u)} - (N_{SYM} - 1) \cdot N_{DBPS}^{(u)})$, where $N_{inf\_o}^{(u)}$ denotes the number of information bits for user u, and $N_{SYM}$ denotes the number of symbols.

At decision 206, the encoder may determine whether $N_{DBPS,Last}$ or $$N_{DBPS,Last} / N_{ES}$$

is an integer. If one of the two values is not an integer, the encoder may apply special padding rules at 207, which may be further illustrated in various examples in FIGS. 3-6. After special padding rules have been applied at 207, the encoder may calculate the number of coded bits for the last symbol at 208 (as further discussed in connection with FIG. 6), and use the computed parameters for FEC encoding at 209.

Specifically, at 207, for a non-short padding scenario, e.g., when the SE parameter a=4, the last symbol can be encoded in the same way as a regular long symbol. Or alternatively, when the SE parameter a=1, 2 or 3, special padding for a non-integer $N_{DBPS,Last}$ or $$N_{DBPS,Last} / N_{ES}$$

are discussed in connection with FIGS. 3-6.

Figure 3:
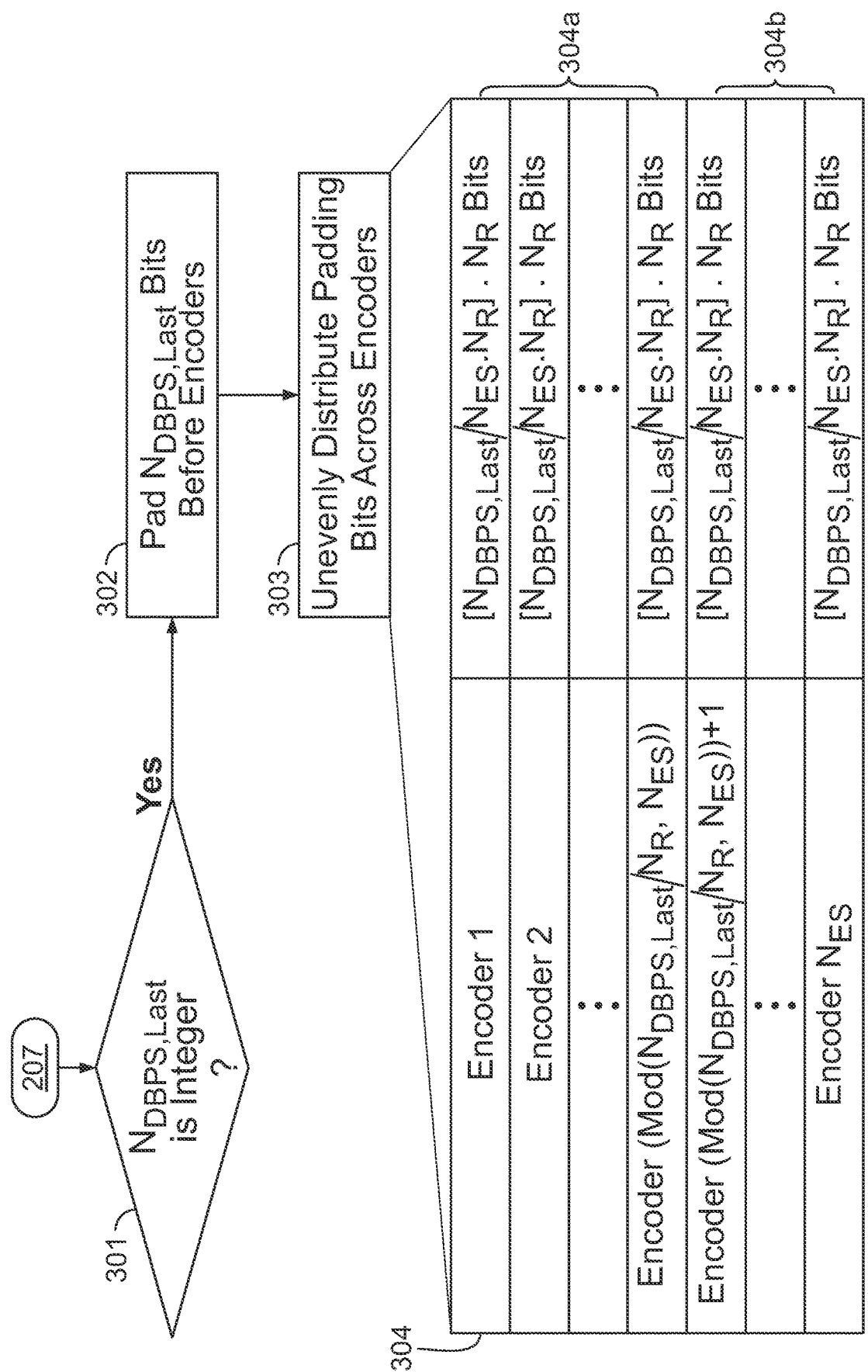
FIG. 3 provides an exemplary logic diagram illustrating an example special padding rule by applying unequal bits per encoder, in accordance with various embodiments of the disclosure.

FIG. 3 provides an exemplary logic flow diagram illustrating an example special padding rule by applying unequal bits per encoder, in accordance with various embodiments of the disclosure. Continuing from 207 in FIG. 2, the encoder may determine whether $N_{DBPS,Last}$ is an integer at 301. When $N_{DBPS,Last}$ is an integer but $$N_{DBPS,Last} / N_{ES}$$

is not, the encoder may pad $N_{DBPS,Last}$ bits before encoders at 302, and then unevenly distribute padding bits across encoders at 302. For example, as shown in the table in FIG. 3, for a list of encoders 304, some encoders may have more bits (e.g., see 304b) padded than the rest encoders (e.g., see 304a).

Specifically, the parameter $N_R$ can be configured to be a different value per coding scheme, e.g., for binary convolutional coding (BCC) and low density parity-check (LDPC) coding. For example, the encoder can set $N_R = 1$ for LDPC, and $N_R =$ the number of bits per puncturing block given the coding rate for BCC.

Figure 4:
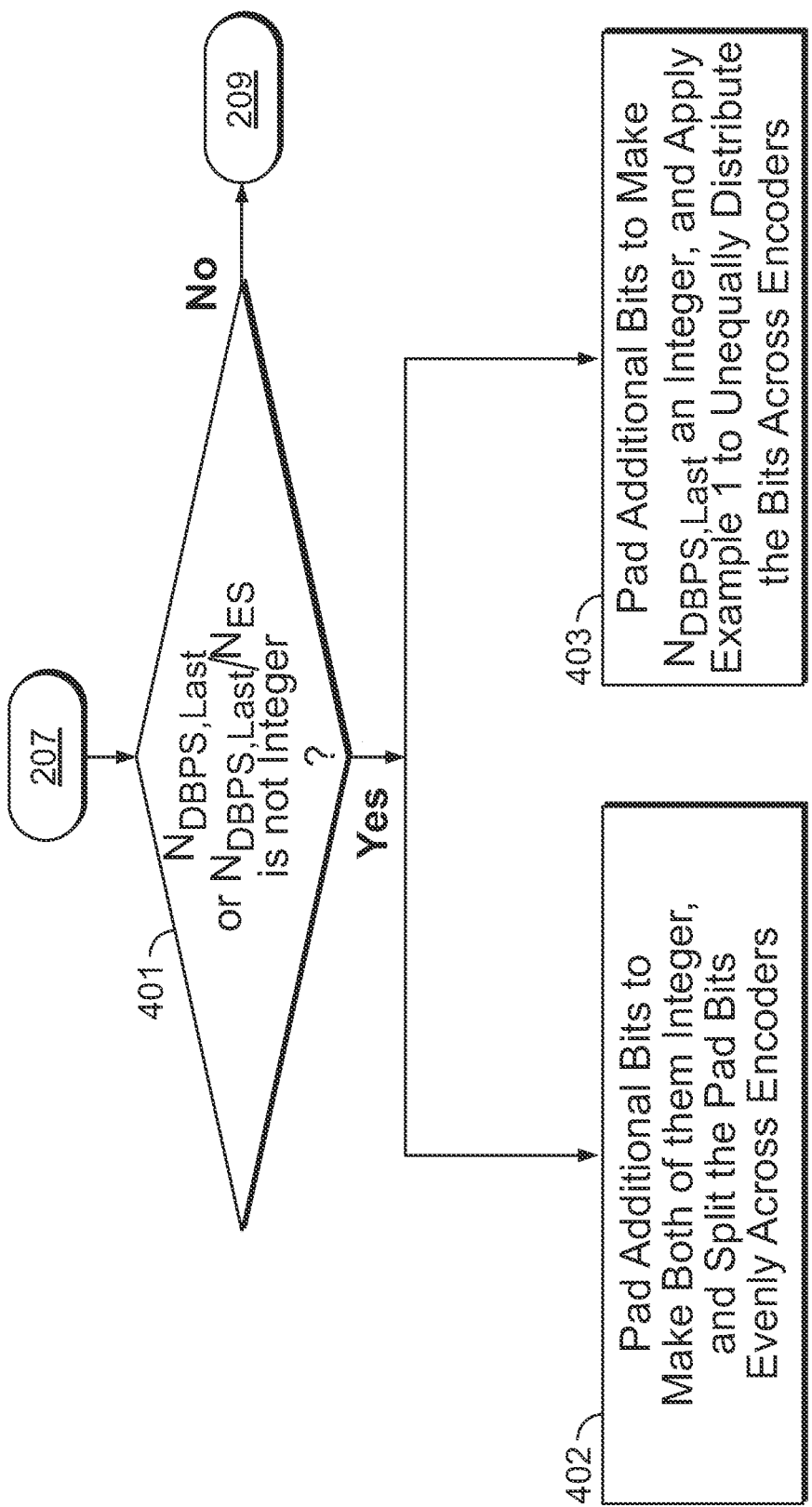
FIG. 4 provides an exemplary logic diagram illustrating an alternative implementation of an example special padding rule by adding additional padding bits, in accordance with various embodiments of the disclosure.

FIG. 4 provides an exemplary logic diagram illustrating an alternative implementation of an example special padding rule by adding additional padding bits, in accordance with various embodiments of the disclosure. Continuing on from 207 in FIG. 2, the encoder may determine whether one of $N_{DBPS,Last}$ and $$N_{DBPS,Last} / N_{ES}$$

is not an integer at 401. If not, the encoder may proceed with 209. Otherwise, the encoder may pad additional bits to make both of the two parameters integral, and then split the padding bits evenly across encoders at 402. For example, the encoder may first pad more bits if $N_{DBPS,Last}$ is not an integer, such that after padding the revised number of information bits for the last symbol may be determined based on the following:

$$\tilde{N}_{DBPS,Last} = \left\lceil a \cdot \frac{1}{4} \cdot N_{SD} \cdot N_{SS} \cdot N_{BPSCS} \cdot R \right\rceil,$$

wherein "⌈ ⌉" denotes a ceiling operation. Then the encoder may pad more bits if $$N_{DBPS,Last} / N_{ES}$$

is not an integer, such that after the padding the revised number of information bits for the last symbol may be determined as follows:

$$\tilde{\tilde{N}}_{DBPS,Last} = \left\lceil \frac{\tilde{N}_{DBPS,Last}}{N_{ES} \cdot N_R} \right\rceil \cdot N_{ES} \cdot N_R.$$

In an alternative implementation, at 403, the encoder may pad additional bits to make $N_{DBPS,Last}$ an integer, and apply 402 to unequally distribute the bits across encoders.

Figure 5:
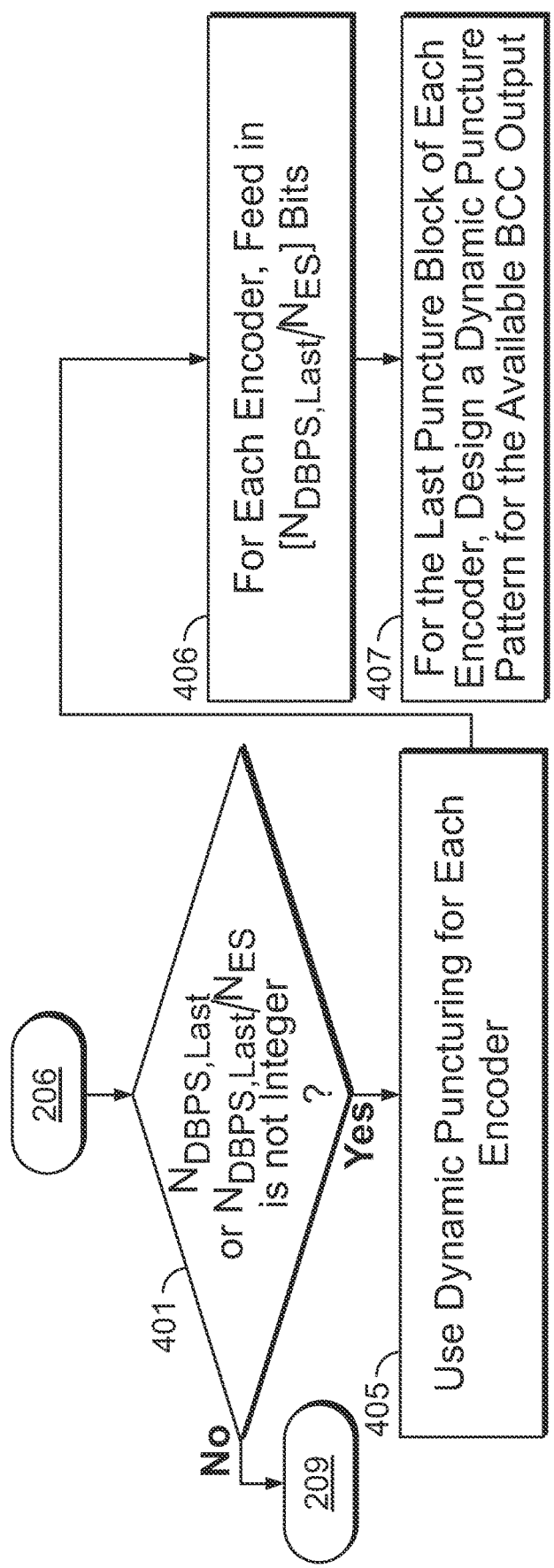
FIG. 5 provides an exemplary logic diagram illustrating an alternative implementation of an example special padding rule by apply dynamic puncturing for each encoder, in accordance with various embodiments of the disclosure.

FIG. 5 provides an exemplary logic diagram illustrating an alternative implementation of an example special padding rule by apply dynamic puncturing for each encoder, in accordance with various embodiments of the disclosure. Similarly, continuing on from 401, when one of $N_{DBPS,Last}$ and $$N_{DBPS,Last}/N_{ES}$$

is not an integer, the encoder may use dynamic puncturing for each encoder at 405. At 406, for each encoder, $$\lceil N_{DBPS,Last}/N_{ES} \rceil$$

may be fed, wherein "⌈ ⌉" denotes a ceiling operation. At 407, for the last puncture block of each encoder, a dynamic puncture pattern can be designed for the available BCC output. For example, any puncture pattern can be applied, such that the number of output bits can be set equivalent to $N_{CBPS,Last}$. If $N_{CBPS,Last}$ is not an integer, then the number of output bits can be set equivalent to $\lceil N_{CBPS,Last} \rceil$, wherein "⌈ ⌉" denotes a ceiling operation.

In an alternative implementation, the encoder can enforce the data bits of the short symbol $N_{DBPS,Short}$ to be an integer. For example, an f( ) mapping can be defined as the following: $N_{DBPS,Short}=f(N_{DBPS,Short}^{(u)})$ such that $N_{DBPS,Short}^{(u)}$ is an integer.

In one example, the encoder can set $\tilde{N}_{DBPS,Short}^{(u)}=\lceil N_{DBPS,Short}^{(u)} \rceil$ or $\lfloor N_{DBPS,Short}^{(u)} \rfloor$, wherein "⌈ ⌉" denotes a ceiling operation, and "⌊ ⌋" denotes a floor operation; and then the SE parameter a and the data bits of the last OFDM symbol $N_{DBPS,Last}^{(u)}$ can be obtained as illustrated in FIGS. 3-5.

In another alternative implementation, the encoder may configure a compatible number of scheduled data subcarriers $N_{SD}^{(u)}$. For example, Instead of using exactly ¼ of scheduled data tones, using a compatible $N_{SD}$ that leads to integer $N_{CBPS,Short}$ and $N_{DBPS,Short}$ for all the MCS's. In this way, the number of information bits of the short symbol can be set as $N_{DBPS,Short}=N_{SD,Short-compatible} \cdot N_{SS} \cdot N_{BPSCS}$, where $N_{SD,Short-compatible}$ denotes a number of scheduled data subcarriers that is compatible for the short symbol. For example, $N_{SD,Short-compatible}$ can be set (close to) the value of $N_{SD}$ of the same bandwidth (BW) in 1× symbols. Examples of compatible $N_{SD}$ are shown in the following:

TABLE 1

Example Compatible $N_{SD}$

| $N_{SD}$ | $N_{SD,Short-Compatible}$ |
|---|---|
| 24 | 6 |
| 48 | 12 |
| 102 | 24 |
| 234 | 48 |
| 468 | 114 or 120 |
| 980 | 234, 240 or 246 |

Figure 6:
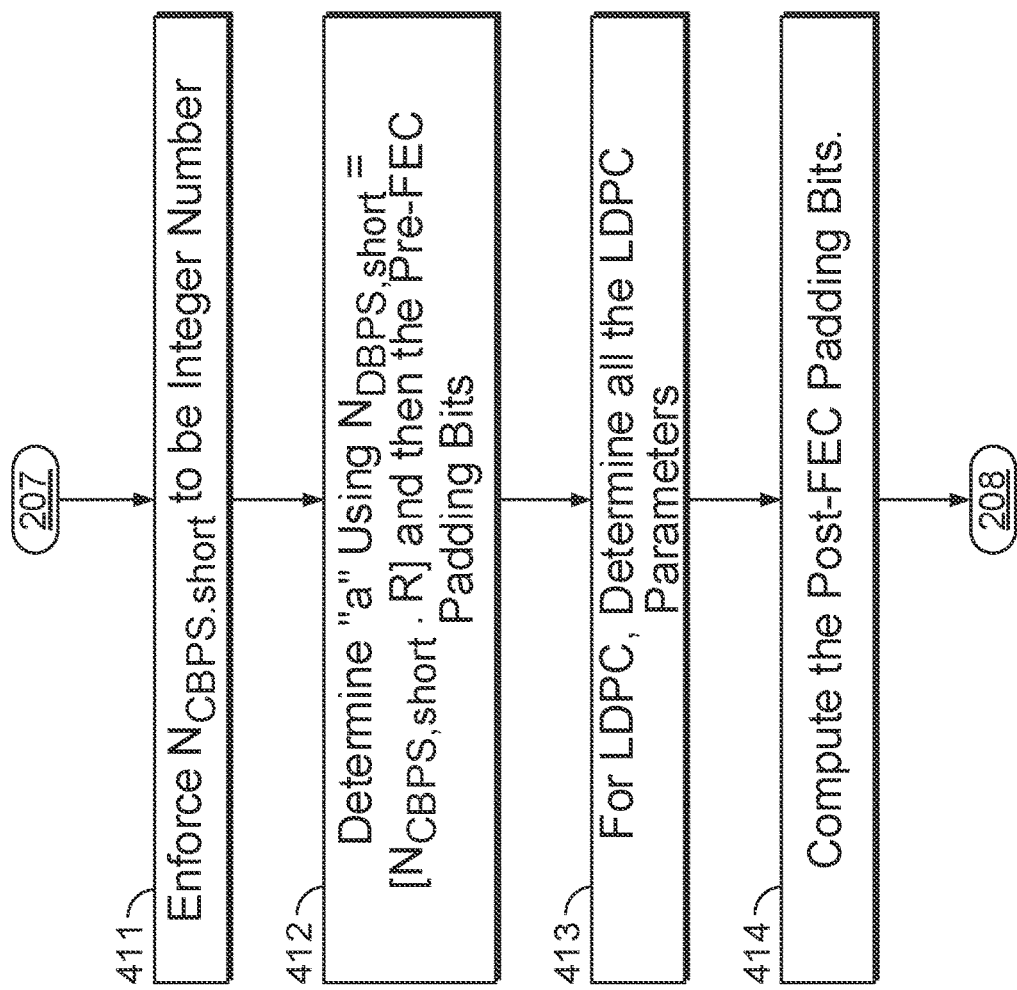
FIG. 6 provides an exemplary logic diagram illustrating an alternative implementation of an example special padding rule by enforcing an integer number of coded bits per symbol for short OFDM symbols, in accordance with various embodiments of the disclosure.

FIG. 6 provides an exemplary logic diagram illustrating an alternative implementation of an example special padding rule by enforcing an integer number of coded bits per symbol for short OFDM symbols, in accordance with various embodiments of the disclosure. Continuing on from 207 in FIG. 2, at 411, the encoder may enforce the number of coded bits of a short symbol $N_{CBPS,short}$ to be an integer number. For example, the encoder can set as $$N_{CBPS,Short} = \left\lceil \frac{1}{4} \cdot N_{SD} \cdot N_{SS} \cdot N_{BPSCS} \right\rceil \text{ or } \left\lfloor \frac{1}{4} \cdot N_{SD} \cdot N_{SS} \cdot N_{BPSCS} \right\rfloor,$$

wherein "⌈ ⌉" denotes a ceiling operation, and "⌊ ⌋" denotes a floor operation. Or in another example, the encoder may use a "compatible" $N_{SD}$ as discussed above in connection with Table 1, which may make the $N_{CBPS,short}$ an integer number. In this case, the number of scheduled data subcarriers for the short symbol can be set as $$N_{SD,Short} = \left\lceil \frac{1}{4} \cdot N_{SD} \right\rceil \text{ or } \left\lfloor \frac{1}{4} \cdot N_{SD} \right\rfloor,$$

wherein "⌈ ⌉" denotes a ceiling operation, and "⌊ ⌋" denotes a floor operation, and the number of information bits of the short symbol can be set as $N_{CBPS,Short}=N_{SD,Short} \cdot N_{SS}$.

At 412, the encoder may determine the SE parameter a by using a number of information bits of the short symbol $$N_{DBPS,Short} = \lfloor N_{CBPS,Short} \cdot R \rfloor,$$

wherein "⌊ ⌋" denotes a floor operation and then add the pre-FEC padding bits. Specifically, for BCC, the number of information bits of the short symbol may be determined as follows:

$$N_{DBPS,Short} = \left\lfloor \frac{N_{CBPS,Short} \cdot R}{N_{ES} \cdot N_R} \right\rfloor \cdot N_{ES} \cdot N_R.$$

In this case, a ceiling operation "⌈ ⌉" can be used alternatively for both BCC and LDPC.

At 413, for LDPC, the encoder may determine all the LDPC parameters, such as but not limited to parity-check matrix, block length, and/or the like. If an extra symbol is needed per LDPC encoding rule, the encoder may update the related LDPC parameters, and also update the number of coded bits of the last symbol $N_{CBPS,Last}$ and the number of information bits of the last symbol $N_{DBPS,Last}$. At 414, the encoder may compute the post-FEC padding bits to fill up the last data symbol, e.g., for post-FEC padding at 105 in FIG. 1.

In one implementation, after applying various special padding rules as illustrated in FIGS. 3-6, the number of coded bits for the last symbol can be re-computed (e.g., see 208 in FIG. 2). Specifically, in case of LDPC, the number of coded bits for the last symbol $N_{CBPS,Last}$ is updated and used together with the number of information bits for the last symbol $N_{DBPS,Last}$ to determine LDPC parameters. For example, $N_{CBPS,Last}$ can be determined based on $$N_{CBPS,Last} = \left\lceil \frac{N_{DBPS,Last}}{R} \right\rceil$$

or $$N_{CBPS,Last} = \left\lceil \frac{\left\lceil \frac{N_{DBPS,Last}}{R} \right\rceil}{R} \right\rceil.$$

$N_{BPSCS}$, where R denotes the coding rate, and "⌈ ⌉" denotes a ceiling operation.

For both BCC and LDPC, after pre-FEC padding parameters is determined, $N_{CBPS,Last}$ can be used be the number of output bits for data transmission (e.g., at 135 in FIG. 1).

The various examples of special padding rules to configure coding parameters as illustrated in FIGS. 3-6, can be employed interchangeably, dynamically, or in a combinational manner. The special padding rules can also be applied to scenarios when space-time block codes (STBC) are used. For example, when STBC is employed, the number of symbols $N_{SYM}$ is calculated differently, but the number of coded bits for the last symbol $N_{CBPS,Last}$ or the number of information bits for the last symbol $N_{DBPS,Last}$ can be obtained in a similar manner as described in FIGS. 3-6.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The foregoing is merely illustrative of the principles of this disclosure, and various modifications can be made without departing from the scope of the present disclosure. The above-described embodiments of the present disclosure are presented for purposes of illustration and not of limitation, and the present disclosure is limited only by the claims that follow.

What is claimed is:

1. A method for forward error correction (FEC) padding, the method comprising:
   obtaining, at a transceiver, a plurality of data symbols for transmission;
   determining a number of information bits that are available for inclusion in a last symbol of the plurality of data symbols;
   selecting a compatible number of scheduled data subcarriers, the compatible number being a fraction of a number of scheduled data subcarriers used for transmission in a single symbol period under a same bandwidth;
   calculating an integer number of information bits for the last symbol based on the compatible number of scheduled data subcarriers;
   adding a number of padding bits to the number of information bits that are available for transmission, wherein the number of padding bits and the number of information bits sum to the integer number of information bits; and
   encoding, for data transmission, the plurality of data symbols, the plurality of data symbols including the last data symbol having the integer number of information bits.

2. The method of claim 1, wherein the number of padding bits is added to the number of information bits before forward error-corrective encoding.

3. The method of claim 1, wherein the number of padding bits is a first number of padding bits, the method further comprising:
   adding a second number of padding bits to the last symbol after forward error-corrective encoding.

4. The method of claim 3, wherein the second number of padding bits consists of bits with value '0'.

5. The method of claim 1, wherein the compatible number of scheduled data subcarriers is dependent on a coding rate used for transmission in the single symbol period under the same bandwidth.

6. A system for forward error correction (FEC) padding, the system comprising:
   an input data processing module to obtain a plurality of data symbols for transmission;
   a pre-encoding padding module communicatively coupled to the input data processing module, the pre-encoding padding module being configured to:
   determine a number of information bits that are available for inclusion in a last symbol of the plurality of data symbols;
   select a compatible number of scheduled data subcarriers, the compatible number being a fraction of a number of scheduled data subcarriers used for transmission in a single symbol period under a same bandwidth;
   calculate an integer number of information bits for the last symbol based on the compatible number of scheduled data subcarriers;
   add a number of padding bits to the number of information bits that are available for transmission, wherein the number of padding bits and the number of information bits sum to the integer number of information bits; and
   encode, for data transmission, the plurality of data symbols, the plurality of data symbols including the last data symbol having the integer number of information bits.

7. The system of claim 6, wherein the number of padding bits is added to the number of information bits before forward error-corrective encoding.

8. The system of claim 6, wherein the number of padding bits is a first number of padding bits, and wherein the pre-encoding padding module is further configured to:
   add a second number of padding bits to the last symbol after forward error-corrective encoding.

9. The system of claim 8, wherein the second number of padding bits consists of bits with value '0'.

10. The system of claim 6, wherein the compatible number of scheduled data subcarriers is dependent on a coding rate used for transmission in the single symbol period under the same bandwidth.

* * * * *